Dec. 21, 1943. G. A. LYON Re. 22,410
ORNAMENTAL TRIM RING FOR WHEELS
Original Filed Jan. 21, 1939 2 Sheets-Sheet 1
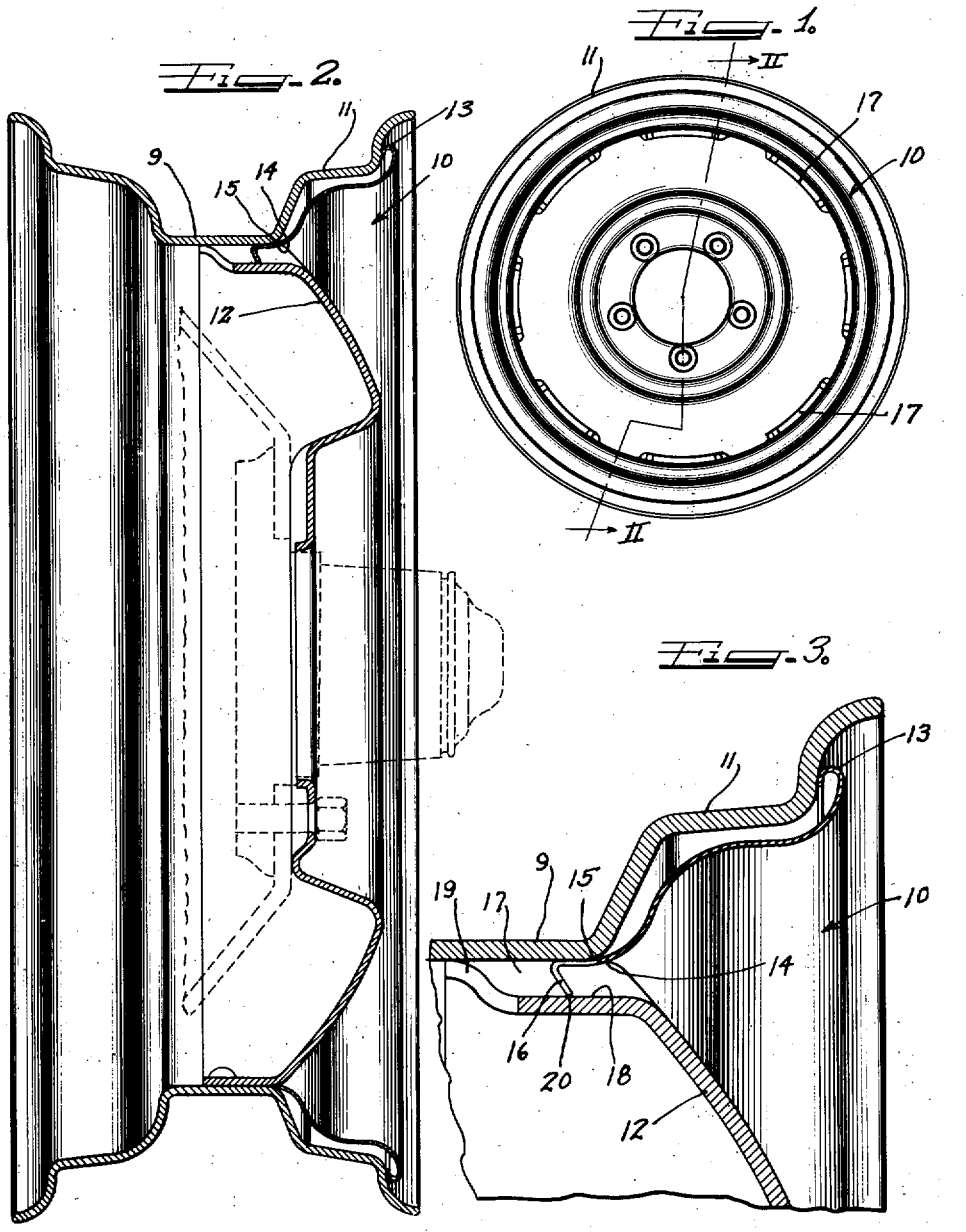
Inventor
GEORGE ALBERT LYON.
by Charles A. Allen
Atty.

Dec. 21, 1943. G. A. LYON Re. 22,410

ORNAMENTAL TRIM RING FOR WHEELS

Original Filed Jan. 21, 1939 2 Sheets-Sheet 2

Inventor
GEORGE ALBERT LYON.

by Charles A. Bell
Atty.

Reissued Dec. 21, 1943

Re. 22,410

UNITED STATES PATENT OFFICE 22,410

ORNAMENTAL TRIM RING FOR WHEELS

George Albert Lyon, Allenhurst, N. J.

Original No. 2,279,330, dated April 14, 1942, Serial No. 252,095, January 21, 1939. Application for reissue April 12, 1943, Serial No. 482,799

14 Claims. (Cl. 41—10)

This invention relates to an ornamental trim ring for a wheel and more particularly to a wheel rim ornamental member held on the rim by reason of engagement with the wheel body.

An object of this invention is to provide an ornamental trim ring for wheel rims which they may intimately overlie an exterior flanged surface of the rim and which is held in cooperation therewith by engagement with the wheel body inwardly of the rim.

Still another object of this invention is to provide trim rings for wheels with retaining means, which is beyond the surface of the rim concealed by the trim ring, whereby the trim ring may intimately hug and follow the irregular surface of the wheel rim.

Still another and further object of this invention is to provide an ornamental trim ring for wheels which may be economically manufactured and which is simple to apply to a wheel having a central wheel body or flange.

In accordance with the general features of this invention, there is provided in a wheel construction an ornamental trim ring comprising a metallic annulus shaped to conform with the external surface of the wheel rim and having an inner marginal portion formed to bear against a wheel member and to have resilient sprung or pressed-on retaining engagement with another wheel member.

More specifically, there is provided an annular wheel rim ornamental member which has an inner marginal portion bearing against an inner portion of the wheel rim and which has its inner marginal portion provided with resilient fingers or teeth for retaining engagement with the wheel body of the wheel inwardly of the tire or wheel rim.

Other objects and features of this invention will more fully appear from the following detailed description taken in connection with the accompanying drawings which illustrate several embodiments thereof, and in which:

Figure 1 is a side view of a wheel construction to which my novel ornamental trim ring has been applied;

Figure 2 is an enlarged sectional view taken substantially on the line II—II of Figure 1, looking in the direction shown by the arrows, and illustrating in dotted lines the central conventional mounting for the wheel;

Figure 3 is a fragmentary sectional view on an enlarged scale corresponding to a portion of Figure 2 showing clearly the coaction between my novel trim ring and the rim and body parts of the wheel;

As shown in the drawings:

Figure 5:
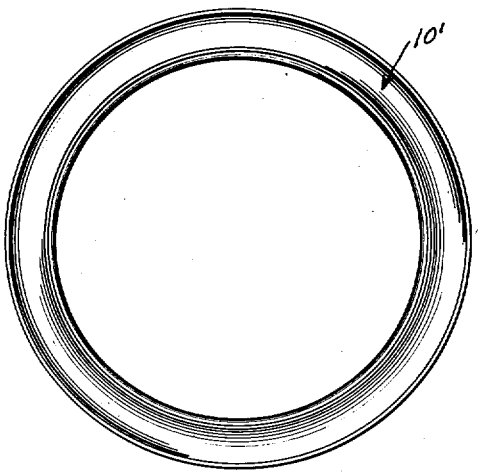
Figure 5 is a side view of a trim ring adapted to be applied to the wheel construction shown in Figure 4.

The reference character 10 designates generally a wheel trim ring embodying the features of this invention. This ring is in the form of a metallic annulus and has a cross sectional shape of irregular contour, as shown in Figure 3, so as to conform to and embrace closely the irregular surfaces of the external flanges of a conventional flanged wheel rim 11. This wheel rim, as is well known in the automotive industry, is commonly referred to as a drop center type of wheel rim. Also, as is well known, the present type of wheel usually embodies two members, namely, the wheel rim or member 11 and a wheel body member 12, sometimes referred to as the hub part. This body member 12 is centrally depressed in the usual way, as illustrated in Figure 2, and is adapted to be mounted in any conventional way upon a central or axle support, one such support being illustrated in dotted lines in Figure 2.

The trim ring 10 may be formed from any suitable metallic sheet or strip, such, for example, as stainless steel stripping. When it is formed from strip stock, it is bent into the shape of an annulus and its ends are welded together to hold the ring in desired circular shape. It may also, if so desired, be made from a stamping. In either event, the inner marginal portion of the ring 10 must be formed into inwardly turned fingers 16 which will be described more in detail hereinafter.

The outer peripheral edge or margin of the ring 10 is rolled or turned back upon itself as indicated at 13 so as to conceal the outer edge of the ring and to enhance the appearance of the ring, which may be chromium plated or otherwise finished on its exterior surface as desired.

As noted before, the ring is of such cross section as to closely follow the exterior surface of the flanged rim embraced thereby. In my previously patented trim rings, I have in several instances provided the retaining means for the ring at the rear of the ring, so that such retaining means was disposed in a space separating the ring from the rim. In accordance with the features of my present invention, the retaining means is disposed at the inner margin of the ring, so that the ring may intimately hug and embrace the wheel rim.

The inner peripheral or marginal portion of the ring 10 is turned in a direction paralleling the axis of the wheel, as indicated at 14, so as to embrace the wheel rim 11 at 15. This arrangement enables the base of the wheel rim to serve as a backing against which the trim ring 10 is pressed when the ring is applied to the wheel.

Also, the inner peripheral marginal portion of the trim ring 10 is formed into a plurality of spaced resilient projections or fingers 16 which are slightly inclined relative to the vertical plane of the wheel but may be said to extend generally in a radial direction or at least toward the axis of the wheel. These fingers or teeth 16 may be of any suitable number, although I have illustrated them in the embodiment of the invention shown in Figures 1 to 3 as being eight in number.

In order to accommodate these spaced fingers or projections 16, the wheel body 12 is provided with a plurality of inwardly depressed sections 17 spaced from the base 9 of the wheel rim 11. It is into these depressed sections that the fingers 16 are adapted to extend and to engage the surfaces 18 at the inner sides of the depressions. It should also be noted that each depression is apertured at 19, the ensuing apertures serving to provide for the circulation of air to the brake drum (not shown).

In applying the trim ring 10 to the wheel, it is pressed or sprung in an axial direction upon the wheel, the fingers or projections 16 riding along the surfaces 18 at the sides of the depressions 17 in the wheel body member 12. Also, due to the particular angle or inclination of the fingers 16, these fingers will have a gripping or biting engagement at 20 with the surfaces 18, thus retaining the trim ring 10 in position over the outer surface of the flanges of the wheel rim being concealed. Moreover, it should be noted that due to the fact that each of these fingers 16 extend at an oblique angle to the vertical plane or, in other words, extend inwardly both radially and outwardly, any tendency to dislodge the wheel ring 12 results in an enhancement of the gripping engagement provided by these fingers.

From the foregoing, it will be appreciated that I have provided a trim ring which, when in retained position on the wheel, embraces one wheel body member, namely, the wheel rim, and grips or bites the other body member, namely, the wheel body member 12. This arrangement is such as to insure a tight and substantial support for the ring 10 on the wheel.

Figure 4:
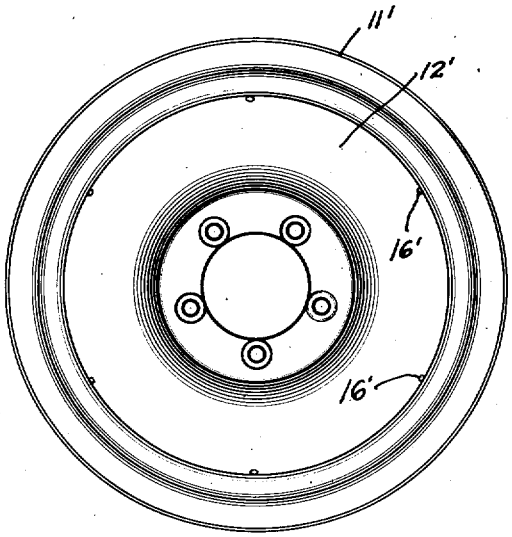
Figure 4 is a side view of a wheel construction to which a modified form of my trim rim may be applied.
Figure 6:
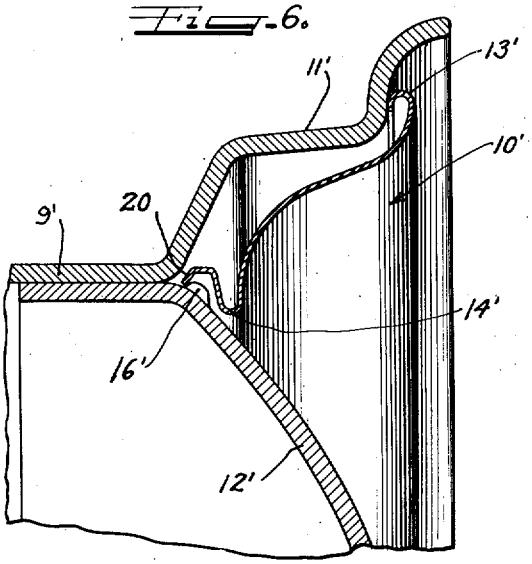
Figure 6 is an enlarged fragmentary cross sectional view taken through a portion of the wheel shown in Figure 4 and illustrating the ring shown in Figure 5 applied thereto.

In Figures 4, 5 and 6, I have illustrated a modification of my invention wherein an annular trim ring 10′ is applied to a wheel including rim and body members 11′ and 12′. The trim ring 10′ has its outer peripheral edge turned back upon itself as at 13′ and is adapted to bear against the surface of the wheel rim 11′. The inner peripheral or marginal portion of the trim ring 10 is turned, as indicated at 14, outwardly or back upon the rear side of the ring 10′. This turned back portion 14′ is formed into a generally axially extending rearward and flexible edge 20 adapted to be sprung or pressed into a retaining engagement with a plurality of spaced bumps or raised portions 16′ on the wheel body member 12′ adjacent the junction of the wheel body member and the rim member 11′.

In the application of this modified form of ring to the wheel, the ring is pressed in an axial direction upon the wheel until its rear flexible edge 20 is snapped over and past the circumferentially spaced bumps or raised sections 16′ on the wheel body. Thereafter the engagement of the turned edge 20 with these bumps 16′ serves to retain the ring 10′ in proper position on the outer side of the wheel rim with the turned edge 13′ bearing against the exterior surface of the wheel rim 11′.

I claim as my invention:

1. In a wheel construction including rim and body members, an ornamental trim ring for one of said members having a marginal portion provided with spring means for retaining said trim ring on the wheel, said spring means bearing against one of said members and having its radially inner extremity pressed into a snap-on engagement with the other of said members, said spring means comprising a plurality of radially inwardly extending resilient ring retaining fingers.

2. In a wheel construction including rim and body members, an ornamental trim ring for one of said members having a marginal portion provided with spring means bearing against one of said members and having its radially inner extremity pressed into a snap-on engagement with the other of said members, said spring means comprising a plurality of radially inwardly extending resilient ring retaining fingers, and which fingers are disposed at such an angle to the wheel member engaged thereby that they will resist with a progressively increasing binding action any tendency to dislodge the ring from the wheel.

3. In a wheel construction including rim and body members, an ornamental trim ring for one of said members having a marginal portion provided with spring fingers for retaining said trim ring on the wheel, said spring fingers each being wedged between and in engagement with both of said members.

4. In a wheel construction including rim and body members, an ornamental trim ring for one of said members having a marginal portion provided with spring fingers for retaining said trim ring on the wheel, said body member having a depressed outer portion and said spring fingers each extending into the depression of said outer portion and being wedged into ring retaining engagement with said body member.

5. In a wheel construction including abutting rim and body members having a junction at the base of the rim member, an ornamental trim ring for one of said members having a marginal portion provided with spring fingers for retaining said trim ring on the wheel, said body member having shoulder means adjacent its outer margin and the junction of said members, and said trim ring having said spring fingers on its inner peripheral margin sprung into retaining engagement with said shoulder means.

6. In a wheel construction including rim and body members, an ornamental trim ring for one of said members having a marginal portion provided with spring fingers for retaining said trim ring on the wheel, said body member having shoulder means adjacent its outer margin, said trim ring having said spring fingers on its inner peripheral margin sprung into retaining engagement with said shoulder means, and said shoulder means comprising a plurality of spaced bumps on the outer peripheral margin of the body part.

7. In a wheel construction including rim and body members, an ornamental trim ring for one of said members having a marginal portion provided with spring means for retaining said trim ring on the wheel, said spring means bearing against one of said members and having its radially inner extremity pressed into a sprung engagement with the other of said members, said resilient means comprising a plurality of radially inwardly and axially outwardly inclined teeth for biting engagement with said wheel body member.

8. As an article of manufacture, an ornamental trim ring for wheels including rim and body parts comprising a metallic annulus shaped to conform with the external surfaces of the wheel rim and having a radially inner marginal portion formed to bear against one of the wheel parts and to have a resilient sprung-on retaining engagement with the other part, said inner margin of said annulus being provided with a plurality of resilient fingers each of which has an intermediate portion formed to bear against one of said parts and having an end portion flexible relative to the bearing of said intermediate portion on said wheel part and retainingly gripping the other wheel part, and said end portion being forced into holding engagement with said other wheel part by reason of the aforesaid bearing.

9. In a wheel construction including a multiflanged rim member and an abutting body member joined together at the base of the rim member, an ornamental trim ring for said rim member and having provided at an inner marginal portion thereof means for retaining said trim ring on the wheel, said trim ring extending radially inwardly for cooperation with the body member and having an outer margin overlying the side flanges of the rim member with the portion of the trim ring between its inner and outer margins spaced from the side flanges of the rim member whereby the inner margin of the ring is bottomed on the body member adjacent the junction of said members for supporting the trim ring on the wheel.

10. In a wheel construction including a multiflanged rim member and an abutting body member joined together at the base of the rim member, an ornamental trim ring for substantially covering the exposed outer side flanges of the rim member and having an outer marginal edge adjacent an outer peripheral edge of the rim member, a radially inner portion of said ring being provided with resiliently flexible means for retaining the trim ring on the wheel with said inner marginal portion supported directly on the body member of the wheel adjacent the junction of said members.

11. In a wheel construction including a multiflanged rim member and an abutting body member joined together at the base of the rim member, an ornamental trim ring for substantially covering the exposed outer side flanges of the rim member and having an outer marginal edge adjacent an outer peripheral edge of the rim member, a radially inner portion of said ring bearing and being supported directly on said wheel body member adjacent the junction of said members, there also being provided at said inner portion attachment means for detachably retaining said ring on the wheel.

12. In a wheel construction including a multiflanged rim member and an abutting dished body member joined together at the base of the rim member, an ornamental trim ring for substantially covering the exposed outer side flanges of the rim member and having an outer marginal edge adjacent an outer peripheral edge of the rim member, a radially inner portion of said ring bearing and being supported directly on said wheel body member, there also being provided at said inner portion attachment means for detachably retaining said ring on the wheel, said attachment means telescoping an opening in the dished body member and retainingly engaging a portion of the wheel body inside said opening.

13. In a wheel construction including a multiflanged rim member and an abutting body member joined together at the base of the rim member, an ornamental trim ring for substantially covering the exposed outer side flanges of the rim member and having an outer marginal edge adjacent an outer peripheral edge of the rim member, a radially inner portion of said ring bearing and being supported directly on said wheel body member adjacent the junction of said members, there also being provided at said inner portion attachment means for detachably retaining said ring on the wheel, said ring being resiliently flexible for application to and removal from the wheel.

14. In a wheel construction including a multiflanged rim member and an abutting body member joined together at the base of the rim member, an ornamental trim ring for substantially covering the exposed outer side flanges of the rim member and having an outer marginal edge adjacent an outer peripheral edge of the rim member, a radially inner portion of said ring bearing and being supported directly on said wheel body member adjacent the junction of said members, there also being provided at said inner portion attachment means for detachably retaining said ring on the wheel, said ring having a resiliently flexible portion arranged to hold said ring in stressed retained engagement with the wheel.

GEORGE ALBERT LYON.